May 14, 1929.  W. C. DWYER  1,712,815
DISK HARROW
Filed Jan. 23, 1928
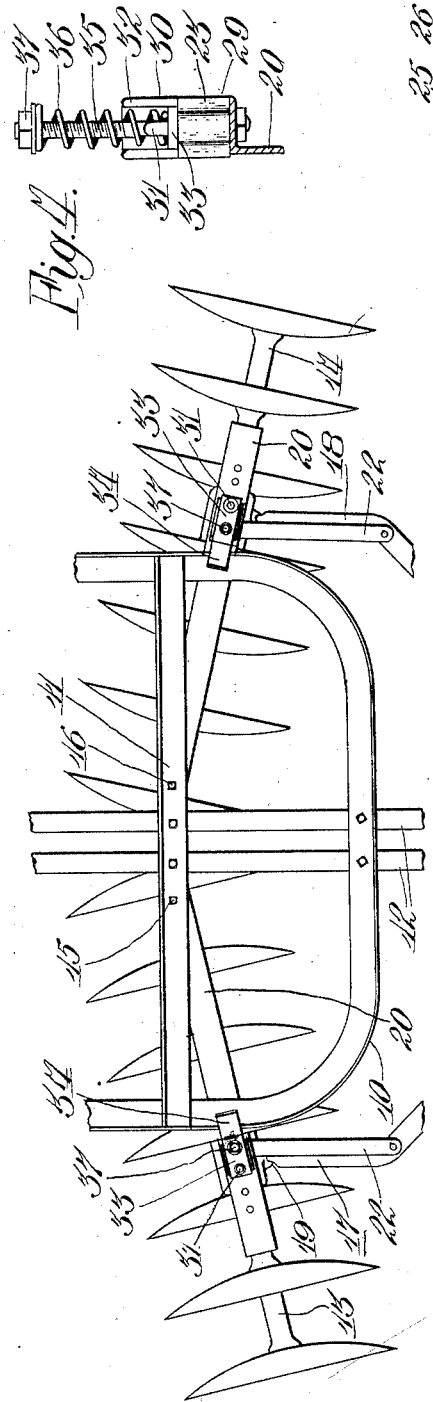
Inventor
William C. Dwyer
By ... Atty.

Patented May 14, 1929.

1,712,815

UNITED STATES PATENT OFFICE.

WILLIAM C. DWYER, OF AUBURN, NEW YORK, ASSIGNOR TO INTERNATIONAL HARVESTER COMPANY, A CORPORATION OF NEW JERSEY.

DISK HARROW.

Application filed January 23, 1928. Serial No. 248,702.

This invention relates to disk harrows and is in the nature of an improvement on a disk harrow of the structure described and claimed in assignee's co-pending application by Robinson et al., Serial No. 154,049, filed December 11, 1926.

The main object of the invention is to construct a disk harrow of the pivoted gang type so as to give a certain degree of flexibility to the individual disk gangs to allow them to conform to irregularities in the ground surface. This is accomplished through a novel manner of connecting the disk gangs to the harrow frame, so that the gangs may have a certain range of vertical tilting movement at all horizontal angular adjustments thereof and in which such vertical movement is limited by yieldable means.

This and other minor objects and advantages, which will be apparent to those skilled in the art, are accomplished through the novel combination and details of construction hereinafter more particularly described and illustrated in the accompanying drawings wherein,—

Figure 1 is a plan view of a portion of a pivoted gang harrow embodying the invention;

Figure 2 is a sectional, front elevation of one of the gangs shown in Figure 1;

Figure 3 is an enlarged detail of a gang connection;

Figure 4 is an end view of the structure seen in Figure 3; and

Figure 5 is a detail of a pivot plate employed for connecting the gangs to the frame.

In the present instance the invention is illustrated as embodied in a disk harrow comprising a main frame formed of an outer U-shaped or arcuate frame bar 10, the arms of which are connected by a transverse bar 11, which bars are secured to a pair of longitudinal bars 12 shown broken off in Figure 1, and which may extend forwardly to form the draft tongue of the harrow in the usual manner. Angularly adjustable disk gangs 13 and 14 are located as usual under the main frame and in this instance are pivoted at their inner ends to central points on the main frame, as at 15 and 16. Angling and straightening of these gangs is accomplished through mechanism (not shown) on the forward end of the longitudinal members 12, to which the connecting bars 17 and 18 shown in part in Figure 1 are connected in any suitable manner. The bars 17 and 18 are pivoted, as at 19, to the respective disk gangs. Each disk gang is carried by a frame comprising a horizontal member 20 and depending standards 21 on the lower ends of which the axle of the disk gang is journaled. A diagonally extending strap or brace member 22 connects each gang frame member 20 with each angling bar heretofore described.

The structure so far described is substantially that of the co-pending application above referred to and forms part of the present invention only in so far as it enters into the novel combination and structure now to be described.

In the practice of the present invention the inner end of each disk frame member 20 has fixed to it a projecting pivot plate 25 shown in detail in Figure 5. The end of this plate is provided with an elongated slot 26 which receives a spacing sleeve or bushing 27 carried on a bolt forming the vertical pivot 15 or 16 of the disk gang. By provision of the slot 26 in the pivot plate 25, a loose pivotal connection of the disk gang frame is obtained and provision is thus made for both horizontal and vertical angular movement of the disk gang and frame. At a point spaced radially from the pivot 15 and preferably contiguous to the member 10 of the main frame, the portion of the gang frame 20 which projects beyond the main frame is provided with a noval form of connection with said main frame member. This connection preferably consists of a bracket or saddle piece 23 bolted or otherwise secured to the upper side of the gang frame member 20 at the connecting point of the brace member 22. As best seen in Figures 3 and 4, the bracket member 23 is formed to straddle the brace member 22 and has upright inner and outer portions or walls 29 and 30 extending from a base or crosspiece 28. The outer wall 29 is provided at a central point with an upwardly extending pin 31 and the wall 30 at each end has upwardly extending parallel pins or lugs 32. The pins 31 and 32 serve as retainers and guides for a connecting plate 33 which has a main horizontal portion seated on the walls 29 and 30 between the pins 32 and receiving the pins 31 in a suitable aperture provided in the horizontal portion of the plate. At its inner end the plate 33 is bent upwardly and then outwardly to provide an offset portion 34 which overhangs the arcuate frame member 10 of the main frame. The connecting plate 33 is yieldably held on the bracket 28 and in position between its guides or retainers by means of a vertical standard or bolt 35 which passes through the horizontal portion of the bracket member 28 and through the gang frame member 20, serving incidentally as the connecting or pivot bolt for the brace 22. The bolt 35 extends upwardly through a suitable aperture in the plate 33, and carries a spiral pressure spring 36, which engages the upper surface of the connecting plate and is held in place on the bolt 35 as by means of a nut and washer 37.

The connection between the gang and main frames just described permits ordinary horizontal angular adjustment of the disk gang frames and in addition to that permits each gang frame to rise and fall with respect to the main frame, as illustrated in Figure 2. Preferably, the overhanging portion 34 of the plate 33 is normally slightly spaced from the main frame member 10, as seen in Figure 3, to allow a certain degree of free motion. When this range of movement is exceeded, the offset extension 34 will engage the upper edge of the main frame member 10, causing the plate 33 to rise in its seat on bracket 23 and compress the spring 36, gradually arresting the downward movement of the gang frame. As the connecting plate 33 approximately follows the curve of the frame member 10 when the gang frame is angled, the connection is effective at all angular adjustments of the disk gang.

It will accordingly be seen that the above construction exemplifies a disk gang mounting in which provision for independent vertical tilting movement of each disk gang is made, and in which resilient resistance to excessive movement of the gangs is provided to prevent undue strain on the connecting parts. It is contemplated that various modifications of the structure disclosed will be possible within the scope of the following claims.

What is claimed is:

1. In a disk harrow, the combination of a main frame, a disk gang frame under the main frame loosely pivoted at one end on the main frame for horizontal angular adjustment, and a vertically yieldable connecting member mounted on one of the frames at a point spaced radially from the pivot point and slidably engaging the other frame.

2. In a disk harrow, the combination of a main frame, a disk gang frame under the main frame, a connection between the frames including means for allowing both horizontal and vertical angular movement between the frames, a guide member carried on the disk gang frame at a point spaced radially from said connection and having a slidable connection with the main frame, and vertically yieldable connecting means between the guide member to the disk gang frame.

3. In a disk harrow, the combination of a main frame, a disk gang frame under the main frame, a connection between the frames including means for allowing both horizontal and vertical angular movement between the frames, and a connecting plate yieldably mounted on the disk gang frame away from said connection and having a portion overhanging and slidably movable along a member of said main frame.

4. In a disk harrow, the combination of a main frame including an arcuate outer bar, a disk gang frame under the main frame having its outer end extending beyond said arcuate bar, a connection between the inner end of the gang frame and the main frame including means for allowing both horizontal and vertical angular movement between the frames, a connecting plate on the gang frame adjacent said arcuate bar having an upwardly offset portion overhanging said bar, an upright guide member on the gang frame engaging said plate, and a spring carried by the guide member and engaging the upper side of the plate.

In testimony whereof I affix my signature.

WILLIAM C. DWYER.